UNITED STATES PATENT OFFICE.

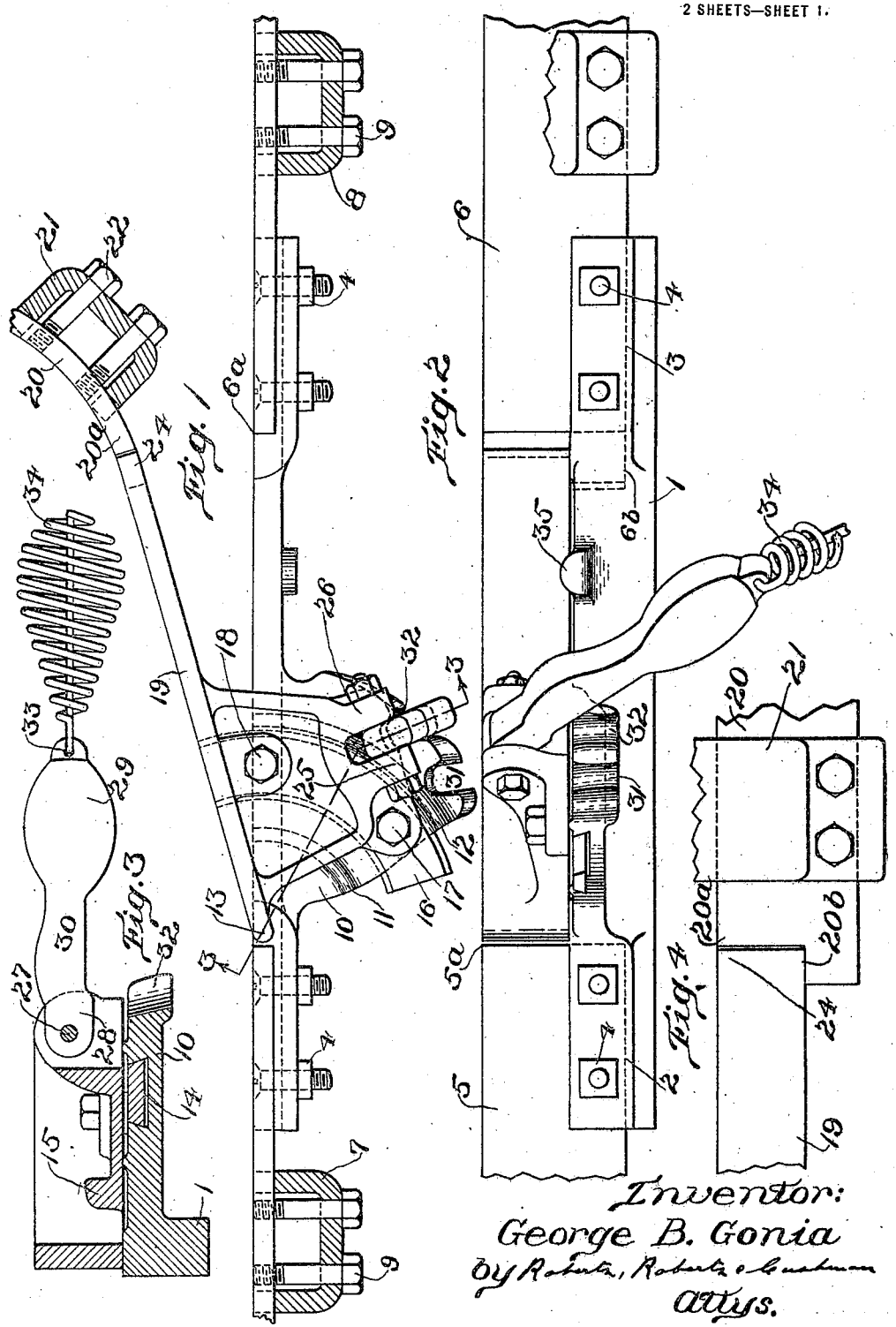

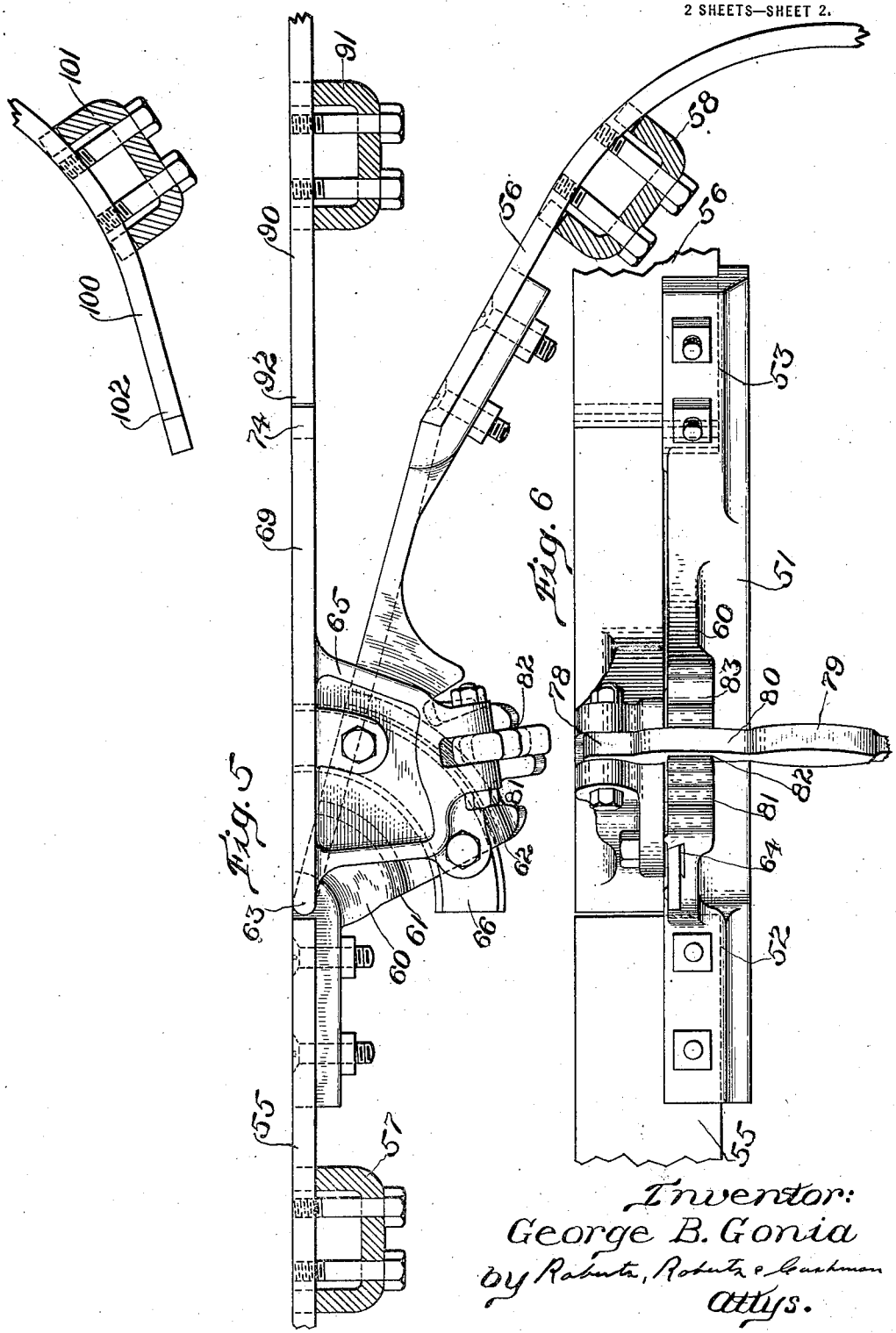

GEORGE B. GONIA, OF SOMERVILLE, MASSACHUSETTS.

TRACK-SWITCH.

1,380,099. Specification of Letters Patent. Patented May 31, 1921.

Application filed September 18, 1920. Serial No. 411,047.

*To all whom it may concern:*

Be it known that I, GEORGE B. GONIA, a citizen of the United States of America, and a resident of Somerville, in the county of Middlesex and State of Massachusetts, have invented new and useful Improvements in Track-Switches, of which the following is a specification.

This invention relates to track switches and particularly to simplified and improved means for supporting, actuating, and locking the movable track element of such switches. While the present invention is more particularly adapted for use in track systems of the mono-rail type, in its broader aspects it is not restricted thereto but may be of general application wherever a movable track element is employed. As herein disclosed the invention is shown as embodied in a mono-rail overhead trolley system such as is commonly employed in meat packing and handling establishments and by means of which carcasses, supported upon suitable wheeled carriers, may be transported from one location to another. In such packing establishments the carcasses handled are often of very considerable weight, while at the same time, due to the restriction of space, it is necessary to arrange diverging tracks at a relatively abrupt angle one to the other. Under such circumstances it is evident that the movable track element of a switch located at the point of divergence of such tracks will be subject to very heavy strains due to the sudden change of direction of the loaded carrier in passing thereover. One object of the present invention is to so mount the movable track section as to permit it to be brought into alinement readily with either of a plurality of diverging fixed track sections while at the same time providing such a rigid support for the same as to permit it to successfully withstand all the strains ordinarily imposed thereon in use. As the wear and breakage upon such a track section commonly occurs closely adjacent that end of the movable track section where it engages the fixed track section it is desirable that the means for supporting such movable section shall be of a character which shall not in any manner tend to weaken the same at such point. As one mode therefore of carrying the above object into effect, such movable section may be mounted upon a support movable in an arcuate path about the free end of the track section as an imaginary pivot, the support for the movable section extending throughout a substantial portion of the length thereof. Such a support may if desired comprise a bracket member fixed to the track section and having an arcuate rib engaging within a suitable slot in a fixed frame member.

As it is necessary in meat packing establishments, due to the length of the carcasses transported, to locate the track at a high elevation above the floor, it is a difficult matter for the operator to reach the movable switch member for actuating the same, and in the ordinary installation various arrangements of ropes, wires, etc., have been employed for assisting the operator in moving the switch member. Such devices are uncertain and inconvenient of operation under the ordinary conditions of use, causing great annoyance to the operator and failing in many instances to produce the desired results. An object of the present invention is to simplify the actuating means for the movable switch member and to provide a positively acting device for this purpose. To this end the switch member, which in accordance with this invention is arranged to move in a substantially horizontal plane, may have directly connected thereto an outstanding arm or handle which may be provided with a depending portion lying within the easy reach of the operator, such arm providing the necessary leverage to permit the operator to move the switch member in a positive manner and with certainty.

It is very desirable in switches of this type that the movable switch member, when once positioned, shall remain locked against accidental movement until further adjustment is desired and that there shall be no tendency of the switch member to become displaced due to the shocks and impacts of the carriers in traversing the same. It is furthermore desirable that the locking means for the switch member be of a simple form, easily manipulated, and such as shall not readily become broken in use. A further object of the present invention is to provide locking means of the character above described which shall be simple and easy to manipulate and which at the same time shall be durable and cheap of construction. One mode of obtaining the desired object is to form the actuating handle above referred to as a weighted lever arm, the weighted portion of said arm being so arranged as to cause said arm normally to assume a vertical depending position. Coöperating with said arm may be provided one or more vertically disposed notches in the fixed frame or support, such notches corresponding to the desired selective positions of the movable track member. By the employment of such an actuating lever it is simply necessary to permit such lever to drop into one of the notches wherein it is retained by its weight, thus locking the movable member in position, and for adjusting such member the lever may be lifted from its notch and utilized as the handle for swinging the movable member. Upon the assumption by the latter of its new adjusted position, the lever may be permitted to drop into the corresponding notch, securely locking the parts in the new position of use. It will be clearly evident that a switch of the type above disclosed may be utilized in a track system having two diverging tracks and equally well in such a system wherein a larger number of diverging tracks are employed, it being simply necessary to vary the number of locking notches in accordance with the number of tracks with which the movable element of the switch is to coöperate. As a preferred embodiment of the invention forming the subject matter of this application, that disclosed in the accompanying drawings may be employed and in which:

Figure 1 is a top plan view of the device forming the subject matter of this application with associated parts;

Fig. 2 is a side elevation of the device shown in Fig. 1;

Fig. 3 is a cross section on the line 3—3 of Fig. 1;

Fig. 4 is a fragmentary, elevational view of certain of the parts shown in Fig. 1;

Fig. 5 is a plan view, and

Fig. 6 an elevation of a modified form of device.

1 is a support having at its opposite extremities recesses 2, 3 respectively, providing seats in which are secured the ends of a pair of fixed track sections 5, 6, such sections being secured to the support by means of bolts indicated at 4.

The track sections 5, 6, may be suspended from any suitable support by means of hangers 7, 8, of usual type and to which the track sections are secured as by means of bolts 9 or in any other desired manner. The adjacent ends 5ª, 6ª of the fixed track sections are spaced apart and at a point intermediate such ends, the support 1 is provided with an outstanding shelf-like bracket 10. The upper surface of the bracket 10 is substantially horizontal and is provided with a pair of arcuate ribs 11, 12, such ribs being of circular curvature, having the point 13 as their center, such point being adjacent the end 5ª of the fixed track member 5. Between the ribs 11, 12, the bracket 10 is provided with an arcuate dove-tail slot 14.

15 is a bracket arranged to be slidably supported upon the ribs 11, 12, such bracket having secured to its under surface a member 16 which is adapted to interlock with the dove-tail groove 14, whereby the bracket 15 is prevented from accidental displacement, while at the same time it is guided to swing in an arcuate path about the point 13 as a center. The member 16 is herein shown as separate from the bracket 15 and secured thereto by bolts 17, but it is contemplated that such member may be formed integral with the bracket if desired. Secured to the bracket 15 in any desired manner or integral therewith is a movable track section 19, the length of which is such as to permit it to span the space between the ends 5ª, 6ª of the fixed track sections. The movable track member thus supported upon the bracket is thereby permitted to turn about the point 13 as a center, one end of such track member substantially coinciding with such point and the other end 24 thereof being adapted to seat upon an extension 6ᵇ extending from the lower portion of the end 6ª of track member 6.

20 is a third fixed track section supported as by means of a hanger 21 connected thereto by bolts 22, such track section being divergent from the track section 6 and having an end 20ª spaced from the end 5ª of track section 5 in such a manner as to permit the movable section 19 to span the space therebetween. The end of the track section 20 may be provided with a seat 20ᵇ for supporting the free extremity 24 of the movable section 19 when the latter is swung into alinement therewith.

The bracket 15 at its outer end is bifurcated to provide a pair of lugs 25, 26 between which is pivoted by means of a bolt 27, a vertically swingable lever arm 28. The lever arm 28 has a weighted extremity 29 and an intermediate section 30 provided with substantially vertical sides. The edge of the plate 10 has formed therein a plurality of vertical open ended notches 31, 32 with which the portion 30 of the lever 28 may be alternatively engaged. The lever 28 at its outer end is provided with an opening 33 in which is secured a handle 34. The handle 34 may however, be dispensed with as the weighted extremity of the lever may serve in many cases as a handle.

If desired the support 1 may be provided with a fixed stud 35 projecting above the upper surface of the support and in a position to stop the swinging movement of the member 19 when the latter has been brought into alinement with the fixed track element 6.

With the parts as shown in Fig. 1, the lever member 28 is out of engagement with either of the notches 31, 32 and may thus be employed as a handle for swinging the bracket 15 together with the track section 19 about the point 13 as an axis. Such swinging movement may be continued until the member 19 is in alinement with both the track sections 5 and 6 and upon release of the handle the weighted lever arm will drop until the part 30 thereof interlocks with notch 1. The parts are thus held in immovable position and a carrier approaching over the section 5 will travel directly across the section 19 onto the section 6. If now it be required to divert carriers to the track 20 the handle is lifted, disengaging the member 30 from the notch 31 and by merely pushing upon the handle the movable track section may be swung into alinement with the section 20, whereupon release of the handle serves to interlock the member 30 with the notch 31. Carriers now approaching upon the section 5 are diverted by the section 19 and caused to travel onto the track section 20.

In the modified arrangement shown in Figs. 5 and 6, the support is indicated at 51 having the seats 52, 53 for the reception of fixed track elements 55, 56, such elements being supported by hangers 57, 58.

As in the first arrangement described, the support is provided with a horizontally extending shelf-like bracket 60 provided with arcuate ribs 61, 62 between which is arranged a slot 64. 65 is a bracket having a member 66 secured thereto, such member fitting the slot 64 and serving to guide the bracket in an arcuate path about the point 63 of the center.

The bracket 65 has pivoted thereto a lever 78 swingable in a vertical plane, such lever having a weighted extremity 79 with an intermediate portion 80. The bracket 60 in this case is provided with a series of vertical slots herein shown as three, designated 81, 82 and 83 respectively, with either of which the portion 80 of the lever 78 may engage.

As will be noted from inspection of Fig. 5, fixed track member 56 diverges from the fixed section 55, being spaced therefrom a distance substantially equivalent to the length of the movable track section 69 secured to the bracket 65. 90 is a third fixed track section supported upon a hanger 91, such section being substantially in alinement with the section 55, the end 92 of such section 90 being spaced from the end of the section 55 and adapted to engage the end 74 of the movable section 69. A fourth fixed track member 100 secured to a hanger 101 is arranged in divergent relation to the fixed sections 56 and 90 and has a free end 102 also adapted to coöperate with the end 74 of the movable section 69.

Without detailed description of the operation of this latter described arrangement, it will be evident that by manipulation of the lever 78 the movable track member may be caused to aline with either of the fixed divergent track sections 56, 90 and 100, and that when in either of such positions the member 80 is adapted to engage with a corresponding notch of the bracket 60 thus securely holding the movable section in adjusted position.

In both of the arrangements heretofore described, it is clear that the movable track section is supported in a very secure manner. The relatively large under surface of the bracket upon which it is mounted and which engages the ribs of the fixed support thus serves to avoid any tendency of such track to tip or twist under the impact of the carriers in traversing the same. It is furthermore evident that as the movable track member is supported at a distance from its end, although turning about the latter as a center, there is no necessity for weakening such end by the provision of a pivot at that point and as such point of the movable track is subject to the greatest wear in opposing the shock incident to diverting the carrier from its normal path, it is evident that much of the difficulty due to breakage of the movable track section at its pivot and which has commonly been experienced with other arrangements, is avoided. The simplicity of the locking arrangement is self-evident, the weighted locking lever acting automatically, when released, to lock the movable member in adjusted position, while for unlocking and swinging such track member, it is only necessary to lift the weighted lever and use the same as a handle for moving such track section.

While a preferred embodiment of the device has been herein disclosed, it is evident that various changes and modifications may be made therein without in any manner departing from the spirit of the present invention, and while the invention has been shown as embodied in switches of the two and three way type only, it is in certain of its aspects of much wider and more general application.

Having thus described the device and the mode of use of the same, what I claim and desire to secure by Letters Patent of the United States is:

1. In a device of the class described, a pair of fixed track members having spaced extremities, a horizontally swingable track member interposed between said extremities, a support for said swingable member, said support rigidly connecting said fixed members, an actuating device for moving said member, and coöperating locking elements carried by said device and said support respectively.

2. In combination in a track switch device, a track member swingable in a plane substantially parallel to its supporting surface, an actuating handle directly connected to said member for moving the same, and fixed elements selectively engageable with said handle for locking the same in adjusted position.

3. In a track switch, in combination a fixed track section having a free extremity, a movable track section mounted to swing horizontally about such extremity as an axis, a lever arm pivotally connected to said movable section to swing in a substantially vertical plane and for bodily movement therewith about said axis as a center, and a part provided with locking notches for engagement by said lever.

4. In a track switch of the class described, in combination a fixed track section, a movable track section mounted to turn in a substantially horizontal plane about the extremity of said fixed section as an axis, and a weighted actuating lever pivotally connected to said movable section and bodily movable therewith.

5. In a track switch of the class described, a movable track member, a weighted actuating lever therefor connected thereto for bodily movement therewith and a relatively fixed part having a plurality of notches for selective engagement by said lever, said lever being retained normally in engagement with its selected notch by reason of its weight.

6. In a switch for use in mono-rail track systems, a fixed support for connecting substantially alined and spaced rail ends, a member mounted on said support to move in an arcuate path and in a plane substantially parallel to the supporting surface of the rails, a track section carried by said member and locking means for retaining said member in a selected position.

7. A switch of the type described comprising a support for a rail end, a bracket carried thereby and having a plurality of guiding ribs having their upper edges substantially parallel to the supporting surface of the rail, a member mounted to slide relatively to said surface and a rail section carried by said member.

8. In a device of the class described a support for a fixed track member, a substantially horizontal plate secured to said support and having a guide element, a bracket mounted for movement in an arcuate path relatively to said plate and about the extremity of said fixed track member as a center, said bracket having an element engageable with said guide element, and a movable track member secured to said bracket.

9. In a track switch, in combination a fixed track section, a movable track section having one end thereof substantially in contact with a free extremity of said fixed track section, means supporting said movable section to swing about said extremity as an axis, an actuating lever connected to said movable section for bodily movement therewith and swingable in a plane substantially perpendicular to the plane of swinging movement thereof and stationary means for interlocking engagement with said lever.

10. In a track switch, in combination a fixed track member, a track member mounted to swing about the free extremity of said member as an axis, a bracket fixed to said movable member and having spaced ears, a lever pivoted between said ears, and a fixed element provided with spaced notches for selective engagement by said lever.

11. In combination, a support for a fixed track element, a lug extending laterally from said support and having a substantially horizontal upper surface, a bracket supported for movement over said surface, interengaging guide elements carried by said bracket and lug respectively, and a movable track member secured to said bracket.

12. In a device of the class described a support for a fixed track element, a lug outstanding laterally from the support and having a substantially horizontal supporting surface provided with an arcuate guide slot, a bracket having an arcuate rib for engagement with said slot, and a movable track member mounted on said bracket.

13. In a device of the class described, in combination a fixed track member having a free extremity, a movable track member and means spaced from said fixed track member for guiding said movable member in an arcuate path about the free extremity of said fixed member as an axis, the pivotal end of said movable member being free from engagement with adjacent parts.

14. In a switch device, a support for a pair of spaced, fixed track members, a bracket carried by said support for lateral movement in the space between the adjacent extremities of said fixed track members, a movable track member carried upon said bracket and constructed and arranged for adjustment whereby to span the space between said extremities an actuating handle secured to said bracket for adjusting the same and means whereby said handle may be secured in selected position of adjustment.

15. In a track switch, a support for a fixed track member, a segmental plate extending laterally from said support and provided with an arcuate, dove-tail slot having the free extremity of such fixed track member as a center, a bracket supported upon the upper surface of said plate, and having an outstanding rib slidably fitting within said slot, and a handle secured to said bracket for moving the same.

16. A track switch device comprising a support for a fixed track section, a segmental plate extending laterally from said support and having a plurality of spaced notches in its edge, a movable track section constructed and arranged to form a continuation of such a fixed track section, and an actuator member for adjusting said movable section, said actuator member having an element for selective engagement with said notches.

17. In combination, a support, a horizontally movable track and a pair of spaced, fixed track members carried thereby, a third fixed track member diverging from the line of one of said fixed members and spaced therefrom, an actuator handle having connection with said movable track member whereby to move the latter to selectively aline it with one of said pair of fixed members or with said divergent member, and locking means for said handle.

18. In combination, a support, a pair of fixed track members having their adjacent ends spaced apart and mounted on said support, a track member mounted upon said support for movement in the space between such fixed members, a plurality of other fixed track members divergent from one of said first named fixed members and from each other, a lever arm connected to said movable member whereby to aline the latter selectively with either of said latter fixed track members or with one of the first named fixed members, and locking means for said lever arm.

19. In a device of the class described a support having a laterally extending segmental lug, a horizontally movable track member mounted upon said lug to swing about one of its own ends as a center, a fixed track member carried by said support and having a free extremity adjacent the pivoting end of said movable member whereby said latter member regardless of its position of adjustment forms a substantial continuation of the fixed member, a plurality of divergent fixed track members constructed and arranged to form continuations of said movable member upon selective adjustment of the latter, and means movable with said movable member for swinging the same, said means coöperating with elements of said lug for locking the parts in adjusted position.

Singed by me at Boston, Massachusetts, this 13th day of September, 1920.

GEORGE B. GONIA.